United States Patent
Depoy

[19]

[11] Patent Number: 6,056,488
[45] Date of Patent: May 2, 2000

[54] LOCKING WINCH BAR

[76] Inventor: Carl R. Depoy, 117 Ritchie St., Buckhannon, W. Va. 26201

[21] Appl. No.: 09/045,872

[22] Filed: Mar. 23, 1998

Related U.S. Application Data

[60] Provisional application No. 60/046,948, May 19, 1997.

[51] Int. Cl.$^7$ ...................................................... B60P 7/08
[52] U.S. Cl. ........................... 410/100; 410/96; 410/103; 410/156; 16/114 R; 74/544
[58] Field of Search .................................. 410/12, 96, 97, 410/100, 103, 156; 16/114 R; 7/168; 74/544, 545; 81/177.2, 177.9, 177.7, 489; 254/DIG. 3

[56] References Cited

U.S. PATENT DOCUMENTS

| | | | |
|---|---|---|---|
| 1,396,140 | 11/1921 | Nelson | 16/114 R X |
| 2,946,563 | 7/1960 | Eaton | 410/103 X |
| 3,053,508 | 9/1962 | Schultz | 410/103 X |
| 3,119,278 | 1/1964 | Simpson . | |
| 3,657,944 | 4/1972 | Able . | |
| 3,707,885 | 1/1973 | Profet . | |
| 3,843,981 | 10/1974 | Verest . | |
| 4,297,916 | 11/1981 | Burroughs . | |
| 4,510,651 | 4/1985 | Prete, Jr. et al. . | |
| 4,860,606 | 8/1989 | Rousseau | 410/100 X |
| 4,873,742 | 10/1989 | Dillon . | |
| 5,425,154 | 6/1995 | Edwards, Jr. . | |
| 5,429,463 | 7/1995 | Howell | 410/156 |
| 5,433,565 | 7/1995 | Chan | 410/103 |
| 5,494,387 | 2/1996 | Ruegg | 410/103 |
| 5,524,505 | 6/1996 | Lawrence . | |
| 5,549,429 | 8/1996 | Sergent | 410/96 |
| 5,791,844 | 8/1998 | Anderson | 410/103 |
| 5,800,105 | 9/1998 | Stump | 410/103 |

FOREIGN PATENT DOCUMENTS

| | | |
|---|---|---|
| 3525322 A1 | 4/1987 | Germany . |
| 7713216 | 7/1979 | Sweden . |
| 1463567 A1 | 3/1989 | U.S.S.R. . |

*Primary Examiner*—Stephen T. Gordon
*Attorney, Agent, or Firm*—Richard C. Litman

[57] ABSTRACT

A locking winch bar having a locking mechanism for securing the winch bar in a winch sprocket so that the bar does not accidentally exit the sprocket. The winch bar has an elongated shaft with a grasping end and a tapering bend at the other end. The shaft includes a groove located at the tapering bend, and within the groove is position a locking mechanism. The locking mechanism includes a lock member having a pawl element at one end and a trigger at the other end. The other end of the lock member is pivotally secured within the groove by a pivot pin, and a spring member is positioned within the groove to act upon the lock member by biasing it outwardly, from the groove. A retaining member secured to the shaft across the groove limits the outward extent of the lock member. Upon pressing the trigger, the lock member is forced into the groove against the action of the spring member, which thereby causes the pawl element to become recessed within the groove.

8 Claims, 4 Drawing Sheets

LOCKING WINCH BAR

CROSS-REFERENCE TO RELATED APPLICATION

This application claims the benefit of U.S. Provisional patent application Ser. No. 60/046,948, filed May 19, 1997.

BACKGROUND OF THE INVENTION

1. Field of the Invention

The present invention relates to locking winch bars used to tighten straps for securing loads on flat bed trailers. More specifically, the present invention provides an improved winch bar and method for engaging flat bed trailer bindings with assurance that the winch bar will not slip with possible resultant injury.

2. Description of Related Art

Leverage extensions for load bindings are well known in the art. Load bindings or tie-down straps are conventionally used for securing cargoes on flat bed truck trailers and the like. Each strap has a first end connected to one side of the trailer, typically using a stake or anchor ring secured to the truck deck. The other end of the strap is connected to a winch which is tightened by a winch bar via a winch sprocket.

FIG. 3 illustrates a conventional winch bar of the type having an elongated shaft 10 with a grasping end 12 and a tapered bent end 14. The tapered end 14 is used for engaging different sized winch sprockets. However, experience of users of the prior art winch bar dictates that severe injuries may result because the tapered end 14 has a tendency to slip from the winch sprocket. Several winch bars are noted in the prior art, however, none appear to alleviate the dangers of the accidental slippage from the winch sprocket.

For example, U.S. Pat. No. 3,119,278, issued Jan. 28, 1964 to Simpson, discloses a safety leverage extension device for use with chain load binders. The device is particularly suited for tightening chain binders, which do not require a turnable winch. U.S. Pat. No. 3,657,944, issued Apr. 25, 1972 to Able, like Simpson above, discloses a safety leverage extension device for use with chain load binders. The device is particularly suited for tightening chain binders, which do not require a turnable winch. U.S. Pat. No. 3,707,885, issued Jan. 2, 1973 to Profet, discloses a handle for turning a hoist having an over-burden bending portion for preventing the operator from overloading the hoist. U.S. Pat. No. 3,843,981, issued Oct. 29, 1974 to Verest, discloses a tool for tightening chain binders. Like Simpson and Able above, the tool does not require a turnable winch.

Each of U.S. Pat. No. 4,297,916, issued Nov. 3, 1981 to Burroughs; U.S. Pat. No. 5,429,463, issued Jul. 4, 1995 to Howell; U.S. Pat. No. 5,524,505, issued Jun. 11, 1996 to Lawrence; Soviet Union Patent Document No. 1,463,567, published Mar. 17, 1989; and Sweden Patent Document No. 7,713,216, published Jun. 27, 1979, discloses a device for tightening chain binders that secure cargo. Each of U.S. Pat. No. 5,494,387, issued Feb. 27, 1996 to Ruegg; U.S. Pat. No. 4,510,651, issued Apr. 16, 1985 to Prete, Jr. et al.; and U.S. Pat. No. 5,549,429, issued Aug. 27, 1996 to Sergent, discloses a self ratcheting strap binder; these devices generally are found intermediate of the ends of the strap binder.

German Patent Document No. 3,525,322, published Apr. 2, 1987, discloses a turnbuckle binding system for stacked containers. U.S. Pat. No. 4,873,742, issued Oct. 17, 1989 to Dillon, discloses a safety tie down bar hand grip system having a bar with a plurality of resilient sleeves thereon. The resilient sleeves provide hand grips or stops for use on a winding rachet winch. U.S. Pat. No. 5,433,565, issued Jul. 18, 1995 to Chan and U.S. Pat. No. 5,425,154, issued Jun. 20, 1995 to Edwards, each discloses a winch or leverage bar for use on cargo binding winch devices. The devices have a predetermined lip and groove for engaging a sprocket hole of a winch. The lip and groove assist in turning the winch sprocket by preventing the bar from slipping out of the sprocket. However, these devices do not accommodate various types of winch sprockets.

Thus a need is seen for an winch bar improving the safety of its use. None of the above inventions and patents, taken either singly or in combination, is seen to describe the instant invention as claimed.

SUMMARY OF THE INVENTION

Accordingly, it is a principal object of the invention to provide a locking winch bar.

It is another object of the invention to provide a winch bar having a selectively releasable lock.

It is a further object of the invention to provide a universally adaptable winch bar with a lock.

Still another object of the invention is to provide a biasing member for assuring the locking engagement of the winch bar.

In accordance with the above-stated objectives, the present invention provides a locking winch bar having a locking mechanism for securing the winch bar in a winch sprocket so that the bar does not accidentally exit the sprocket. The winch bar has an elongated shaft with a grasping end and a tapering bend at the other end. The shaft includes a groove located at the tapering bend, and within the groove is position a locking mechanism. The locking mechanism includes a lock member having a pawl element at one end and a trigger at the other end. The other end of the lock member is pivotally secured within the groove by a pivot pin, and a spring member is positioned within the groove to act upon the lock member by biasing it outwardly from the groove. A retaining member secured to the shaft across the groove limits the outward extent of the lock member. Upon pressing the trigger, the lock member is forced into the groove against the action of the spring member, which thereby causes the pawl element to become recessed within the groove.

When the tapered, bent end of the shaft is inserted into the winch sprocket, the pawl element is biased upwardly by the spring member to prevent accidental slippage of the shaft end from the sprocket. To remove the shaft from the winch sprocket, a user will depress the trigger to urge the lock member against the spring member, thereby allowing the pawl element to enter the groove. With the pawl element recessed within the groove, the end of the shaft may be safely and easily removed from the winch sprocket.

It is a further object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

As a matter of background, while transporting cargo laden vehicles, each load of cargo generally is secured to the cargo bed by some sort of binding. Generally, these bindings are tightened via a winch mechanism which typically has a winder or sprocket that receives a winch bar for turning the sprocket. The turning of the sprocket causes the winch to tighten the bindings using a unidirectional type racheting lock member. To avoid a winch bar from accidentally slipping from the sprocket, the present invention is a universally adaptable winch bar lock for securing the winch bar in the sprocket, and selectively releasing the winch bar from the sprocket.

Figure 1:
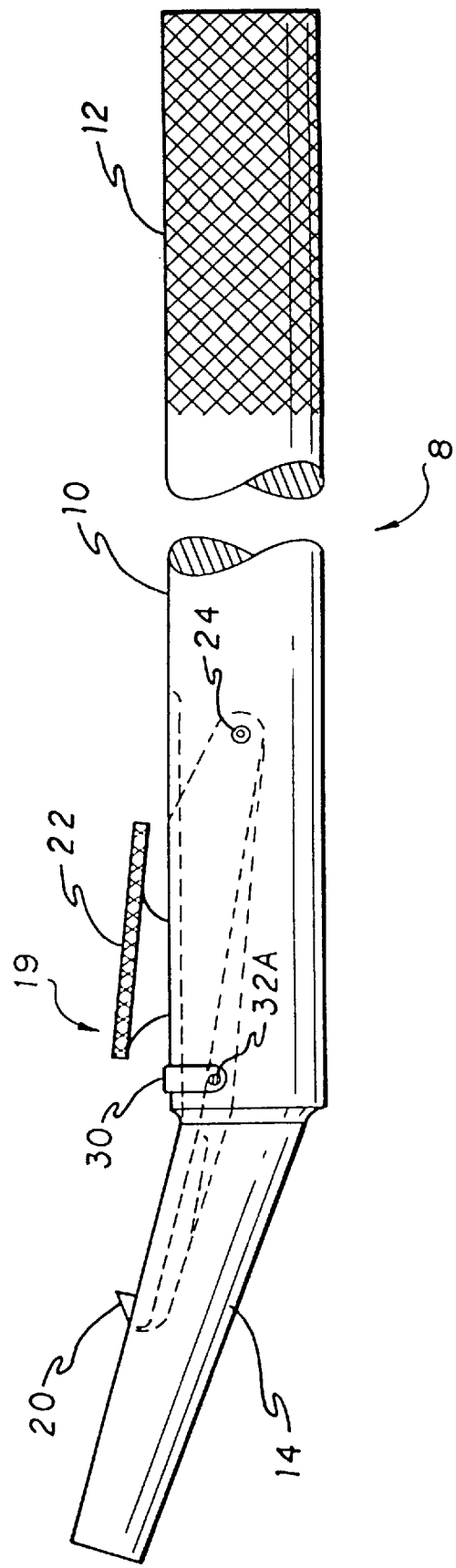
FIG. 1 is a side elevational view of the present invention, showing a fragmented handle to indicate indeterminate length.
Figure 2:
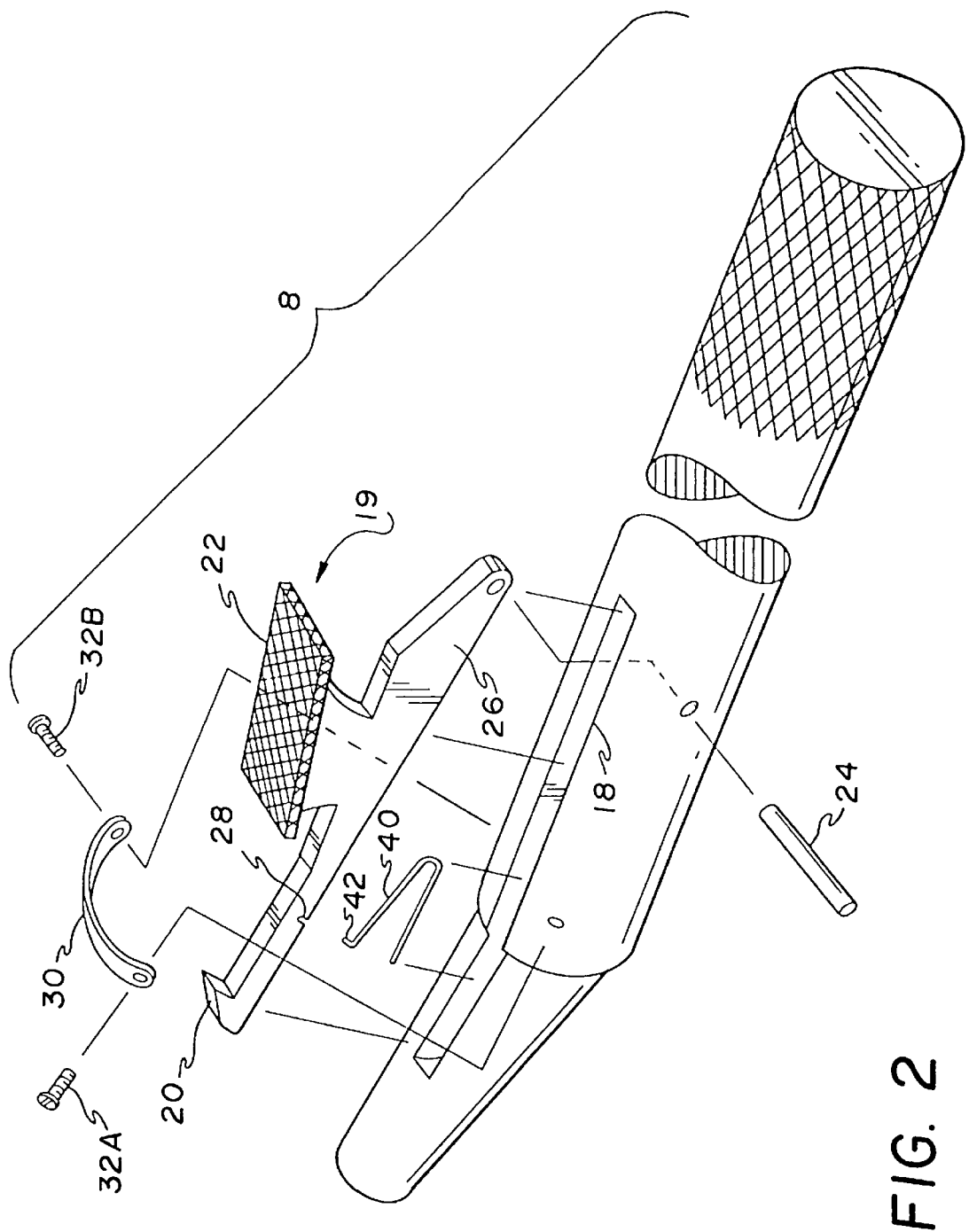
FIG. 2 is an exploded perspective view of the present invention showing the cooperation of the elements.
Figure 3:
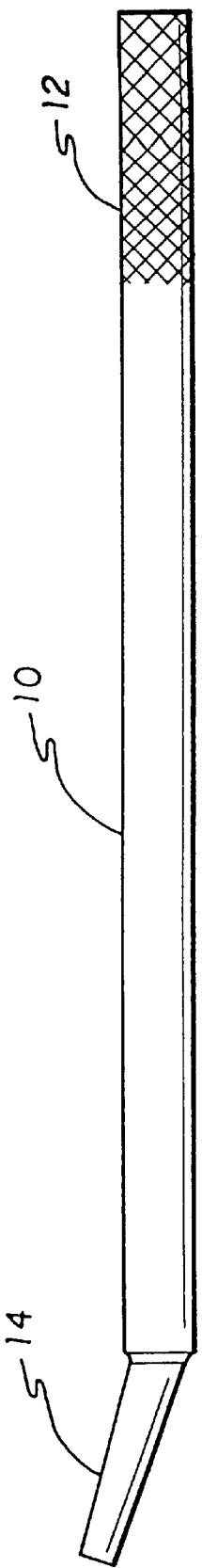
FIG. 3 is a side elevational view of the prior art winch bar.

A first embodiment of the present invention illustrating the main inventive components, as seen in FIGS. 1 and 2 is an improvement over conventional prior art winch bars (note FIG. 3). A winch bar 8 of the present invention has an elongated shaft 10 having a first, grippable end 12. The grippable or graspable end 12 is formed by any conventional method. For example, the end 12 may be knurled, or may have a highly frictional and/or malleable surface bonded thereon (e.g., rubber, foam, etc.). The grippable end 12 provides the operator sure handling of the winch bar when in use.

The shaft 10 also has tapered, bent end 14 for engaging winch sprockets. The invention provides a longitudinal groove 18 along the shaft 10 at the end 14. The groove 18 cooperatively supports a locking mechanism for the winch bar. The locking mechanism has a member 19 including a locking pawl 20 at an end thereof. Locking pawl 20 is moveable in the groove 18. The locking pawl 20 engages the winch sprocket, securing the winch bar thereto and preventing the tapered end 14 thereof from slipping out of the winch sprocket. The locking pawl 20 and tapered end 14 are useable on various sized winch sprockets, thus making the winch bar universally adaptable to a multiplicity of winch type load binders.

The locking mechanism is secured within the groove 18 by a pivot pin 24 which passes through an aperture (not shown) at an opposite end 26 of the member 19. The pivot pin 24 sets the end 26 in fixed disposition within the groove 18. The locking mechanism, however, is allowed to rotate about the pivot pin 24 at the end 26. In this way, the locking pawl 20 moves in and out of the groove, thus engaging and disengaging a winch sprocket.

In order to maintain engagement with a winch sprocket, a spring member 40 is also disposed in the groove 18. The spring member 40 has a fixing tip 42 that cooperates with a notch 28 of the member 19, keeping the spring member 40 in fixed working relationship with the member 19.

The locking mechanism is prevented from exiting groove 18 by a retainer member 30, which is a band secured to the periphery of the winch bar shaft 10 across the groove 18 by a first fastener 32A and a second fastener 32B. The retainer member 30 restricts the displacement of the locking pawl 20 when biased by spring member 40.

The locking mechanism also has a release trigger 22 for selectively releasing the locking pawl 20 from a winch sprocket. The release trigger 22 is a protrusion of the pawl protruding above the groove 18 centrally positioned between a pivot pin 24 and the tooth of the pawl 20. The trigger 22 is actuated manually by pressing thereon. The manual depression of the trigger 22 causes the pawl 20 to sink into the groove 18 about pivot pin 24. Sufficient depression counters the action of spring member 40, causing it to compress, thereby releasing the tooth of the locking pawl 20 from the winch sprocket. The manual actuation of the locking mechanism acts in opposition to the biasing action of spring member 40, thus providing a selective release for the winch bar lock of the present invention.

Figure 4:
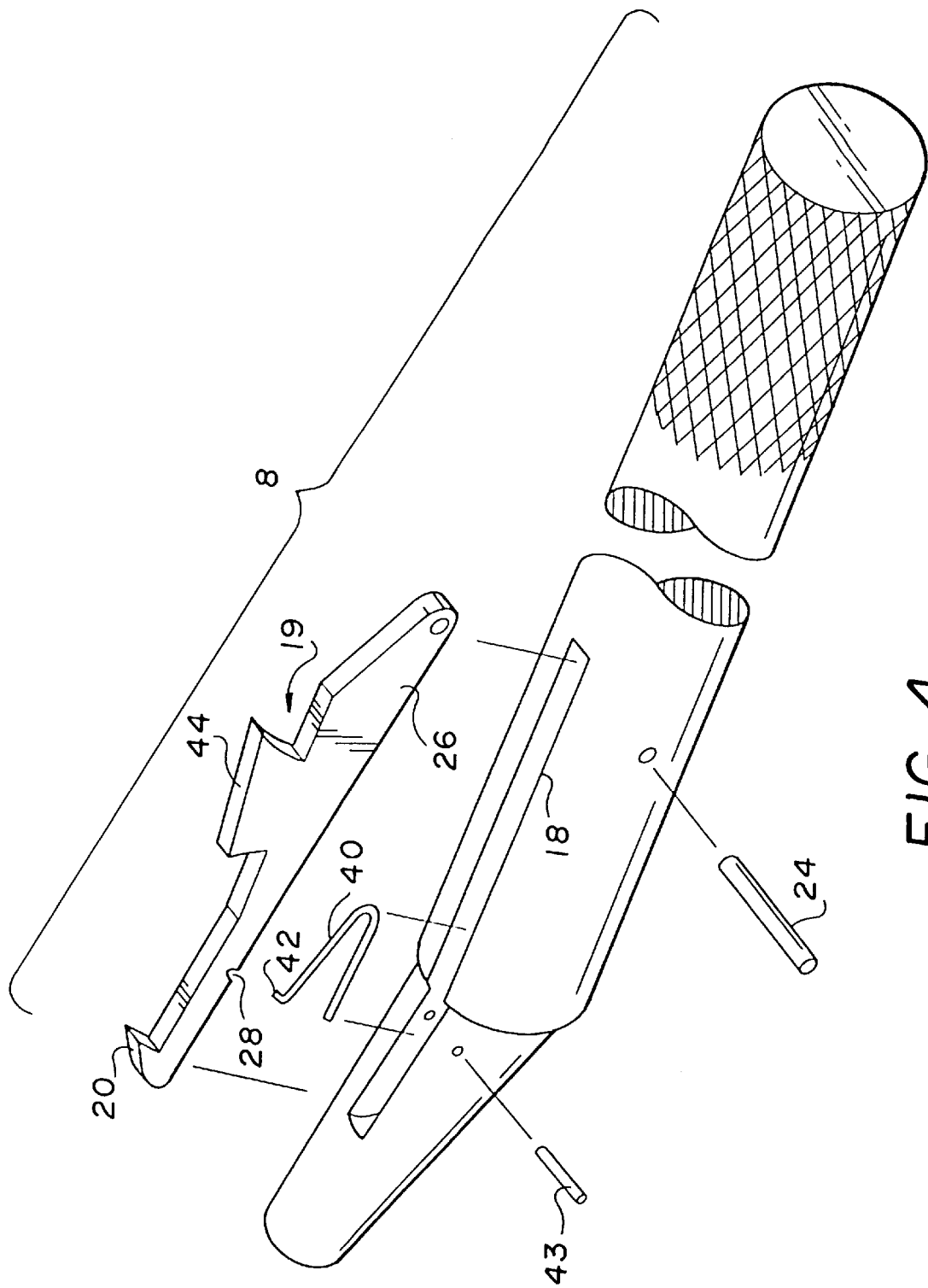
FIG. 4 is an exploded perspective view of a preferred embodiment of the present invention showing the use of a roll pin retainer.

FIG. 4 shows a preferred embodiment of the present invention that uses a retainer roll pin 43 to retain the locking mechanism within the groove, instead of retainer member 30 and first and second fasteners 32A,32B as depicted in FIGS. 1 and 2. When assembled, the roll pin 43 passes through the bent end 14 over the pawl 20, thereby preventing its escape from groove 18. In addition, the release trigger surface 44 of the locking mechanism of the preferred embodiment depicted in FIG. 4 has been downsized to a simple knurled part 44 of the locking mechanism.

The locking winch bar of the present invention provides a safe, inexpensive, and useable tool for transporters to secure cargo to the cargo bed. The locking winch bar of the present invention allows the transporter to use a winch in non-friendly environments, such as inclement weather, along roadway shoulders, in low light intensities, etc. The reduction of injuries by the use of this locking winch bar will decrease the losses previously incurred by transporters, thus improving the total economics of the cargo transporting industry. The universally adaptable winch bar simplifies the binding of cargo on different carriers, resulting in less time and manpower used.

It is to be understood that the present invention is not limited to the embodiment described above, but encompasses any and all embodiments within the scope of the following claims.

I claim:

1. A winch bar for operating a load binding winch mounted on a trailer engaging a ratcheting drive winch sprocket including a plurality of holes, said winch bar comprising:

an elongated shaft having a first end and a second end;

said first end having means for grasping;

said second end having an angle therein between 90° and 180° relative to said first end, and said second end being tapered;

a pawl means disposed in said second end, said pawl means for releasably locking said second end of said shaft to the winch sprocket upon engagement thereof.

2. The winch bar according to claim 1, further including means for biasing said pawl means into locking engagement with the winch sprocket.

3. The winch bar according to claim 2, further including means for selectively releasing said pawl means from locking engagement with the winch sprocket.

4. The winch bar according to claim 3, further comprising means for securing said pawl means to said shaft; said means including a pivot pin and a retainer.

5. The winch bar according to claim 4, further comprising a groove in said shaft; said pawl means being disposed in said groove, said pivot pin coupling said pawl means at a first point to said shaft within said groove, said retainer for retaining said pawl means in said groove.

6. The winch bar according to claim 5, wherein said retainer is a roll pin passing through said second end and said groove.

7. The winch bar according to claim 5, wherein said retainer is a band and a first fastener and a second fastener securing said band to said second end across said groove.

8. The winch bar according to claim 5, wherein said pawl means includes a pawl pivotally attached within said groove and a trigger integral with said pawl, said trigger protruding above said groove.

* * * * *